(12) United States Patent
Howard et al.

(10) Patent No.: US 8,381,021 B2
(45) Date of Patent: Feb. 19, 2013

(54) SYSTEM AND METHOD FOR AUTOMATED UNATTENDED RECOVERY FOR REMOTELY DEPLOYED INTELLIGENT COMMUNICATION DEVICES

(75) Inventors: Edward Glenn Howard, Crystal Springs, MS (US); Thomas Hunter Cobbs, Sandy, UT (US)

(73) Assignee: Itron, Inc., Liberty Lake, WA (US)

( * ) Notice: Subject to any disclaimer, the term of this patent is extended or adjusted under 35 U.S.C. 154(b) by 337 days.

(21) Appl. No.: 12/899,455

(22) Filed: Oct. 6, 2010

(65) Prior Publication Data

US 2012/0054540 A1    Mar. 1, 2012

Related U.S. Application Data

(60) Provisional application No. 61/377,028, filed on Aug. 25, 2010.

(51) Int. Cl.
*G06F 11/00* (2006.01)

(52) U.S. Cl. .......................................... 714/6.12; 714/23

(58) Field of Classification Search .................... 714/23, 714/2, 6.12, 4.4, 4.11, 6.31, 36; 713/1, 2, 713/100, 300

See application file for complete search history.

(56) References Cited

U.S. PATENT DOCUMENTS

| | | | |
|---|---|---|---|
| 6,615,365 B1 * | 9/2003 | Jenevein et al. ............. 714/6.11 |
| 6,839,792 B2 | 1/2005 | Feldstein et al. | |
| 7,167,945 B2 | 1/2007 | Feldstein et al. | |
| 7,293,128 B2 | 11/2007 | Feldstein et al. | |
| 7,487,343 B1 | 2/2009 | Insley et al. | |
| 2002/0188837 A1 * | 12/2002 | Dayan et al. ...................... 713/2 |
| 2004/0088697 A1 * | 5/2004 | Schwartz et al. ............. 717/174 |
| 2006/0174099 A1 | 8/2006 | Wang | |
| 2007/0050675 A1 | 3/2007 | Yu | |
| 2007/0101040 A1 | 5/2007 | Feldstein et al. | |
| 2007/0124604 A1 | 5/2007 | Feldstein et al. | |
| 2008/0148038 A1 | 6/2008 | Abe et al. | |
| 2008/0184025 A1 * | 7/2008 | Dayan et al. ...................... 713/2 |
| 2008/0276123 A1 * | 11/2008 | Sudhakar et al. ................. 714/6 |
| 2009/0144538 A1 | 6/2009 | Duda et al. | |

* cited by examiner

*Primary Examiner* — Dieu-Minh Le
(74) *Attorney, Agent, or Firm* — Dority & Manning, P.A.

(57) ABSTRACT

In one embodiment, an intelligent communications device for operating in a network is disclosed. The device includes a storage device having a plurality of partitions storing images for performing boot operations. The device also includes a detection module that is operative to detect a boot failure, and a first restoration module that is operative to restore an active image with a first backup image, in response to a detected boot failure from an active image. The device further includes a second restoration module that is operative to restore a second backup image in response to a detected boot failure after restoration from a first backup image. The device also includes a programmable processor that is programmed to cause execution of boot operations and functions performed by the detection module, first restoration module, and second restoration module.

40 Claims, 11 Drawing Sheets

SYSTEM AND METHOD FOR AUTOMATED UNATTENDED RECOVERY FOR REMOTELY DEPLOYED INTELLIGENT COMMUNICATION DEVICES

CROSS REFERENCE TO RELATED PATENT APPLICATION

This application claims the benefit, pursuant to 35 U.S.C. §119(e) of U.S. provisional Application Ser. No. 61/377,028 filed Aug. 25, 2010, entitled "System and Method for Automated Unattended Recovery for Remotely Deployed Intelligent Communication Devices" by Edward G. Howard and Thomas H. Cobbs, the disclosure for which is hereby incorporated by reference in its entirety.

FIELD OF THE INVENTION

The present application relates generally to network routers, and more specifically to an intelligent communications device for a smart grid, hereinafter also referred to as an "apparatus" or "network apparatus", for managing interconnection of various electrical devices and facilities.

In one aspect, the present invention relates to a system and method for automated unattended recovery for remotely deployed intelligent communication devices.

BACKGROUND OF THE INVENTION

Field-deployed communication devices must be able to maintain unattended normal function for long periods of time. Among other needs, there is a need to provide for automated recovery of communications devices in response to debilitating events such as hardware failures, malicious attacks, or faulty code implementations.

SUMMARY OF THE INVENTION

In one aspect, the present invention relates to a system and method for controlling operation of a plurality of electronic devices in a smart grid. In one or more exemplary embodiments, an intelligent communications device is operatively connected with other devices and/or systems and one or more electrical distribution networks. One or more of these electronic devices may work in collaboration with the intelligent communications device in a smart grid network infrastructure. In one or more embodiments, the electronic devices may be arranged in various configurations to operate in networks such as LAN, WAN, and/or HAN networks.

In one embodiment, the intelligent communications device is configured with other devices and/or monitoring equipment for monitoring and management of electrical energy consumption. The intelligent communications device operates on wireless communications networks and according to one or more wireless protocols such as commercial cellular, Bluetooth, and/or 802.11.

In one embodiment, the intelligent communication device is field upgradable, and is configured such that additional hardware can be installed for enabling new protocols or technologies to be developed. The intelligent communications device is operative to implement open source software configured to facilitate integration of different types of devices with additional circuitry and/or hardware. Further, the intelligent communications device is operable to update the open source software periodically or at a pre-defined time.

According to another aspect, the present invention relates to an intelligent communications device in a network that is configured for automated unattended recovery.

According to yet another aspect, the present invention relates to a computer-implemented method for automated recovery of a remotely deployed intelligent communication device in a network.

According to yet another aspect, the present invention relates to a computer-readable medium having stored instructions which, when executed by one or more processors, cause a computer to perform functions for an automated unattended restart of a remotely deployed intelligent communications device in a network.

DETAILED DESCRIPTION OF THE INVENTION

Description of the various embodiments detailed below is for understanding the invention. It will be understood that the invention is not limited to the particular embodiments described herein, but is capable of various modifications, rearrangements and substitutions, which will now become apparent to those skilled in the art without departing from the scope of the invention. Therefore, it is intended that the following claims cover all such modifications and changes that fall within the spirit and scope of the invention.

In alternative embodiments, system, process, and apparatus may include additional, fewer, or different components. In addition, the each component may include additional modules, software, and interface devices that may be appended on requirement to operate the present invention in alternate embodiments.

Figure 1:
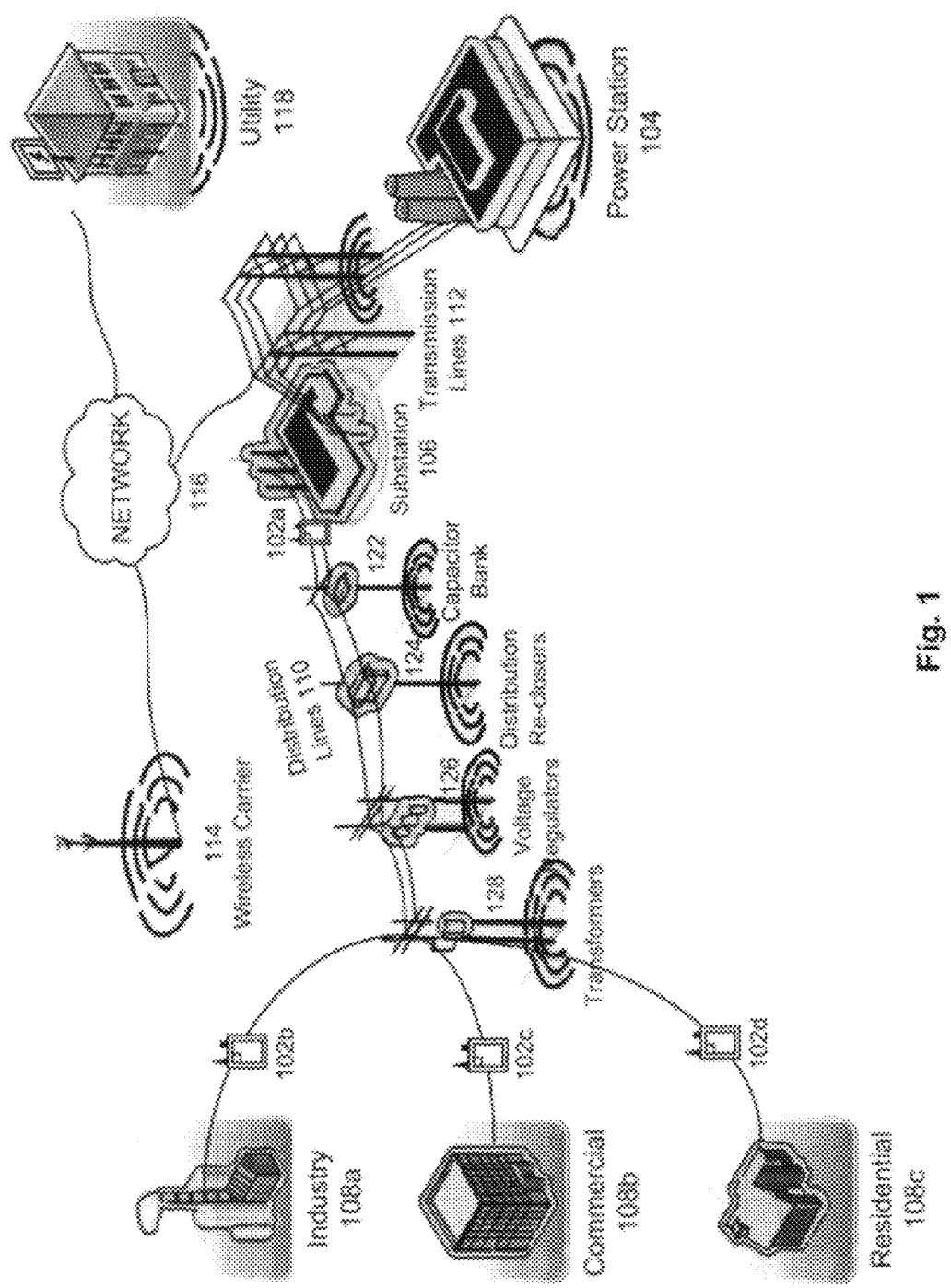
FIG. 1 is a schematic illustration of an overall environment in which one or more aspects of the present invention can be practiced.

Referring to FIG. 1, an intelligent communications device for a smart grid communicatively coupled to a plurality of devices and/or facilities for management of energy requirements is depicted. Integration of the intelligent communications device 102 into the smart grid infrastructure may be performed using minimal capital expenditure.

FIG. 1 illustrates an environment in which the present invention may be practiced. The environment may include a plurality of electrical generation facilities such as thermal power plants, hydro-based power plants (dams, for example), solar powered electricity generation units, and wind powered electricity generation units. Various electricity-generating plants are collectively referred to as power generation units 104. The electricity generated from the power generation units 104 may be distributed through a plurality of high voltage transmission lines 112 to a substation 106. For example, high voltage electricity may be distributed via plurality of towers and a plurality of medium voltage distribution cables 110.

By way of example and not a limitation in one implementation, the substation 106 may receive power from the plurality of high voltage transmission lines 112 from at least one of the plurality of substations such as power station 104. Further, the substation 106 may be associated with an intelligent communications device 102. The intelligent communications device 102 may monitor various parameters such as quality of electricity and electrical load.

The substation 106 may then distribute low voltage electricity to residential entities 108c, industrial entities 108a, and/or commercial entities 108b. The medium voltage distribution lines 110 may include attachments of various devices for improvement of quality electricity. As such, the plurality of distribution lines 110 may run moderate distances and are affected by cable resistance, electrical grid loading, and other factors which constantly effect the operation and efficiency of the electric grid. In order to compensate for a variety of operating conditions, the plurality of distribution lines 110 may include connections to capacitor banks 122, distribution re-closers 124, voltage regulators 126, transformers 128 and other types of equipment.

The electricity may be supplied to the one or more industrial entities such as industry 108a, via intelligent communications device 102b. Likewise, the plurality of distribution lines 110 may feed electricity to one or more commercial entities such as commercial entity 108b, one or more residential entities 108c, through intelligent communications devices 102c and 102d. Hereinafter, intelligent communications devices 102a, 102b, 102c, and 102d may be collectively referred to as "intelligent communications device 102."

The intelligent communications device 102 may be configured to operate with a central control station, regulatory authority, audit compliance authority, and/or electrical monitoring systems. Apart from monitoring the various parameters such as electrical quality, the intelligent communications device 102 may be coupled wirelessly to a plurality of wireless carriers such as 114. Alternatively, the intelligent communications device 102 may be coupled with communications network 116 using powerline communication. Further, the wireless carrier 114 may receive signals that may be utilized for moderating the distribution of electricity from the substation 106 to industrial entity 108a, commercial entity 108b, and/or residential entity 108c.

The intelligent communications device 102 may be connected with a plurality of utilities in a building, a commercial complex, and/or an industry. By way of example and not a limitation, in one implementation, intelligent communications device 102 may be connected to utility 118. In an embodiment, the utility 118 may include lighting systems, refrigerators, air conditioners, computers, televisions, home theaters, electric irons, water filters, air filters, air compressors, and/or vacuum cleaners. The intelligent communications device 102 may directly control the utility 118. In another embodiment, one or more intelligent communications devices 102 may indirectly control the utility 118. In yet another embodiment, the utility 118 may be partially controlled by one or more intelligent communications devices 102 for modulating the electrical consumption. It may be noted that only one implementation is provided; however, those skilled in the art would appreciate that various other implementations are possible without deviating from the scope and spirit of the invention.

The utility may be grouped into essential and non-essential electrical equipment for purposes of control. In this embodiment, the intelligent communications device 102 may be programmed to monitor the one or more utilities 118 on a rule based program.

In an embodiment of the present invention, the intelligent communications device 102 may be coupled to multiple consumers such as industrial entities 108a, commercial entities 108b, and residential entities 108c. The consumer 108a, 108b, and 108c may be hereinafter collectively referred to as 'consumers 108'. The intelligent communications device 102 may facilitate management of electricity to one or more consumers 108. Additionally, the intelligent communications device 102 may also be integrated to communications backhaul providers that may work in synchronization for accumulating data related to electrical consumption, load distribution, quality of electricity, power factor, and/or failure of equipment associated with the distribution of electricity. The information may be communicated to control and monitoring station, either through the network 116 or through wireless carriers 114.

In an embodiment of the present invention, the consumers 108 may be distributed in a geographically area and may be connected to each other through a smart grid. In addition, each consumer 108a may have one or more smart appliances. The smart appliances may be managed by the intelligent communications device 102 for optimizing electricity consumption.

Figure 2:
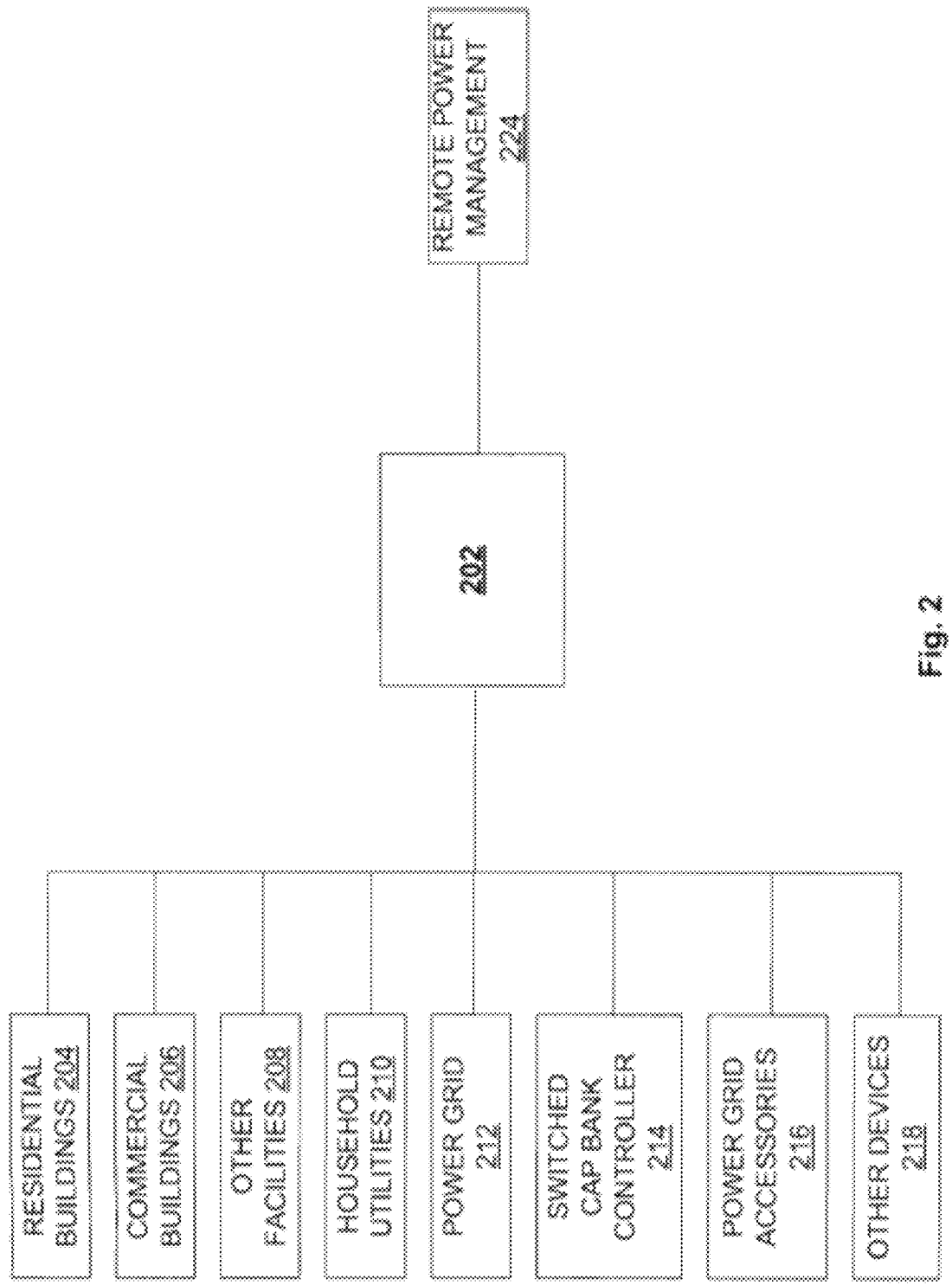
FIG. 2 depicts various facilities, devices and equipment interfaced with an intelligent communications device according with one embodiment of the present invention.

Referring to FIG. 2, an arrangement of configuring various electrical facilities with an intelligent communications device 202 is shown, according to one embodiment of the present invention. The intelligent communications device 202 may communicate with the plurality of devices and/or facilities, such as but not limited to, residential buildings 204, commercial entities 206, other facilities 208, household utilities 210, power grids 212, switched cap bank controllers 214, grid accessories 216, other devices 218, and remote power management utilities 224. Other facilities 208 may include but not limited to schools, small offices, sports complexes, shops, malls, federal offices, utility complexes, or other types of buildings having electrical connection and consuming electricity. The intelligent communications device 202 may facilitate energy management for one or more of the devices and/or facilities as shown.

Power Management

In an embodiment of the present invention, the intelligent communications device 102 may enable distribution companies to reduce the overall power requirement through better management. This in turn may help in reducing the need for power generation thereby reducing environmental damage. Further, the intelligent communications device 102 may act as a communications hub for monitoring electrical usage, power consumption, quality of electricity, and/or analysis of electrical load, where examples of load type may include inductive load and/or capacitive load. The communications hub may interface various devices in order to monitor electricity consumption and/or power usage.

The intelligent communications device 102 may enable integration of various utilities with the grid for optimizing the overall performance of the system. For example, the load requirement of a particular building may be assessed/monitored using the intelligent communications device 102. The data collected by the intelligent communications device 102 from the various utilities may be utilized for improving the overall electrical consumption of these utilities thereby saving cost and electricity. Alternatively, the intelligent communications device 102 may monitor the performance of different electrical utilities and may facilitate their management in an optimized way.

In another embodiment, the intelligent communications device 102 may be utilized by distribution companies for monitoring the quality of electricity and load characteristics for a specific area. The data recorded by the intelligent communications device 102 may be utilized for increasing the operational efficiency of the power grid.

In another embodiment, the intelligent communications device 102 may facilitate management of demand response for a grid. Currently, power generation and/or power distribution companies face pressure to reduce load either electronically or manually. In such settings, transmission grid operators use demand response to request load reduction in order to manage demand. One or more aspects of the present invention according to this exemplary embodiment allow for transmission grid operators to utilize the intelligent communications device 102 for electronically managing the demand response of electricity.

Integration with Power Grid

In one embodiment, the intelligent communications device 102 may include a communication module for connecting it with a smart grid. In this aspect, the intelligent communications device 102 may increase the performance of the smart grid making it more adaptable and cost effective. In addition, the intelligent communications device 102 may enable utilities to interface with the grid irrespective of the underlying technology, network, or assets. The intelligent communications device 102 may be flexible to accommodate any configuration changes and/or bandwidth changes without affecting the underlying architecture/technology.

In another embodiment of the present invention, the intelligent communications device 102 may communicate with other apparatuses. The communication may be either wireless or through wired connection. Such communication may occur in response to a critical event such as power surge, excess demand, low power factor, when immediate action is required for safeguarding the electrical equipments associated with transmission infrastructure. In another embodiment, the communication between different apparatuses may occur on a continuous basis for optimizing the performance of the system.

Field Upgradability

In another aspect of the present invention, the intelligent communications device 102 may be field-upgradable and may provide field replaceable units for preventing obsolescence. The intelligent communications device 102 may allow utilities to add multiple communication technologies to the smart grid communication infrastructure with change of the underlying technology. By integrating multiple communication technologies, the intelligent communications device 102 may act as a universal hub, to reduce the cost of purchasing additional equipment for implementing multiple network communications protocols. Consumers 108 may integrate multiple appliances and multiple communication technologies using intelligent communications device 102 thereby reducing the total cost of ownership of the equipment. Additionally, consumers 108 may upgrade the intelligent communications device 102 to integrate new communication protocols by just installing additional circuitry without changing existing equipment.

The intelligent communications device 102 may further include a software update module that may connect to the Internet for availability of firmware updates. In response to availability of firmware updates, the software update module may back-up the current firmware before upgrading the intelligent communications device 102 with the new firmware. Failure to implement the new firmware may result in reinstallation of the old firmware from the back up.

In another embodiment of the present invention, the intelligent communications device 102 may include additional slots for inserting PCB boards. These PCB boards may include circuitry for enabling specific protocol, for example, the PCB on PCB board may implement EDGE protocol. Similarly, in another example, a PCB board may implement WiMax protocol. Field service personnel may insert additional PCB boards for upgrading the existing communication protocol without having to replace the intelligent communications device 102. Thus, the intelligent communications device 102 may be upgraded while in operation.

In another embodiment of the present invention, the intelligent communications device for a smart grid may include PCB boards supporting various communication technologies such as but not limited to, WiMax, EDGE, IPv4/IPv6, Bluetooth, Infrared, broadband over powerline, and Ethernet. Software configured in the intelligent communications device 102 may be utilized to enable/disable one or more communication boards. Thus, in one implementation, the apparatus may support Ethernet. In another implementation, the intelligent communications device 102 may support Ethernet and Bluetooth. In these scenarios, the field service personnel may update the intelligent communications device 102 by enabling the boards supporting various communication technologies remotely.

In yet another embodiment of the present invention, the intelligent communications device 102 may include utilities, circuitry for upgrading it on site. Further, the intelligent communications device 102 may include software and/or modules for adding multiple communication technologies to the smart grid communications infrastructure based on future needs without having to replace an entire system backbone. By virtue of having capabilities for adding new devices and facilities, the intelligent communications device 102 may allow consumers to purchase and integrate non-interoperable proprietary technologies from multiple vendors. Vendors may integrate heterogeneous devices using intelligent communications device 102 thereby creating an open environment. In this aspect, the intelligent communications device 102 may allow for consumers to avoid being committed to a specific vendor.

Consumption Monitoring

Consumers of electricity may save money by planning their energy requirements in area implementing Time-Of-Use (TOU) pricing. Consumers may plan the use of electrical appliances in off-peak hours, when the cost of electricity is less, for reducing the total cost of electricity consumption. The intelligent communications device 102 may facilitate the reduction in total consumption of electricity by automatically switching on the electrical appliances in non-peak hours.

Network Protocol Implementation

The intelligent communications device 102 may be based on Internet Protocol (IP) thereby providing seamless integration with different type of networks. For example, the intelligent communications device 102 may facilitate communication with both public and private networks. In embodiments, the network may be either a wired network or a wireless network. Further, networks classified on the basis of scale, such as LAN, WAN, HAN, or functional relationships, such as client server, peer-to-peer, and/or active networks, overlay networks are included within the scope the invention. In an exemplary embodiment, the intelligent communications device 102 communicates using TCP/IP. Likewise, the intelligent communications device 102 may interface with other devices implementing conventional protocols.

The intelligent communications device 102 may facilitate smart grid-enabled appliances to communicate wirelessly with electrical distribution companies to manage their overall consumption of electricity. For example, the intelligent communications device 102 may manage consumption of electricity during peak hours for a distribution network. In this aspect, the intelligent communications device 102 may communicate in real-time with various facilities and other devices to optimize energy efficiency.

In an embodiment of the present invention, the intelligent communications device 102 may include an Ethernet interface for connecting it with external network such as LAN, WAN, or HAN. Further, the Ethernet interface may enable communication with Internet thereby facilitating remote management of utilities. The intelligent communications device 102 may record various parameters such as electricity consumption, power usage and may transfer the recorded data to the remote infrastructure management facility for optimization of the electrical consumption. To this end, the intelligent communications device 102 may enable optimum utilization of the grid infrastructure. The intelligent communications device 102 may be built for outdoor use and may be protected from environmental hazards.

The intelligent communications device 102 may be capable of interfacing with various protocols, networking standards, and other specifications. In an example, the intelligent communications device 102 may facilitate communication by implementing WiMax protocol. In another example, the intelligent communications device 102 may communicate using Bluetooth protocol. In embodiments, the intelligent communications device 102 may communicate using other protocols such as but not limited to token ring, EDGE, UDP, datagram and other proprietary Internet communications protocols. In an example, the intelligent communications device 102 may facilitate communication with ZigBee protocol that allows devices in the home to communicate with a smart meter and neighborhood hub.

In an embodiment of the present invention, the electrical distribution companies may analyze the electrical consumption data collected over a specified period for better management of energy. The intelligent communications device 102 may include a communication link with a database for storing electrical consumption data. In an embodiment, the specified period may be an hour, a day, a month, a year, or any combination of these.

The intelligent communications device 102 may facilitate interoperability among smart grid devices, thereby facilitating seamless deployment of smart devices in a smart grid. In this aspect, various smart devices including smart appliances and smart meters may work in harmony with the intelligent communications device 102. Thus, the intelligent communications device 102 may integrate into the existing smart grid deployment without competing with other existing devices. Alternatively, it may enhance the capability of other smart devices. In an embodiment of the invention, the intelligent communications device 102 may allow integration with other devices without the need for installing additional devices and/or interface circuitry. The smart devices can be configured with the intelligent communications device 102 for management of smart appliances for increasing the operational efficiency of the smart grid. Smart appliances refer to the class of products that enable communication with smart meters and neighborhood hub for saving energy.

The intelligent communications device 102 may enable Internet Protocol based communication involving end-to-end connectivity on a public wireless network. The intelligent communications device 102 may further facilitate two-way delivery of real-time energy usage data over a public wireless network. In an embodiment, the real-time data may include location information along with energy usage information.

In an embodiment of the present invention, the intelligent communications device 102 may include one or more communication ports for connecting to different types of communication devices. The intelligent communications device 102 may include switches, hubs or other interface circuitry for coupling with the external devices. Additionally, the intelligent communications device 102 may include a wireless communication module for connecting with wireless appliances and/or smart devices. In this aspect, the wireless devices such as smart appliances may be enabled by low power protocol such as 6 LOWPAN. Alternatively, the wireless devices may be enabled using Bluetooth, EDGE, IEEE 802.11, and/or infrared.

Open Standards Implementation

The intelligent communications device 102 may implement open standards to leveragie existing programs and tools. In this aspect, the intelligent communications device 102 may facilitate rapid application deployment and delivery of the new functionality. For example, the intelligent communications device 102 may update the applications and/or programs in real time. Additionally, updates corresponding to programs and/or applications may be executed at a predefined time in order to update the software, drivers, interface ports, applications. This may ensure that the intelligent communications device 102 may be fully equipped to deny any security attack on it. In another example, interfacing a new smart device with the intelligent communications device 102 may initiate a search for software. Failure to discover appropriate software may result in searching the required software at a remote location such as the Internet. Thus, the intelligent communications device 102 may perform self-healing by automatically scanning and integrating new devices and/or facilities in the smart grid infrastructure.

Enclosure

Figure 3A:
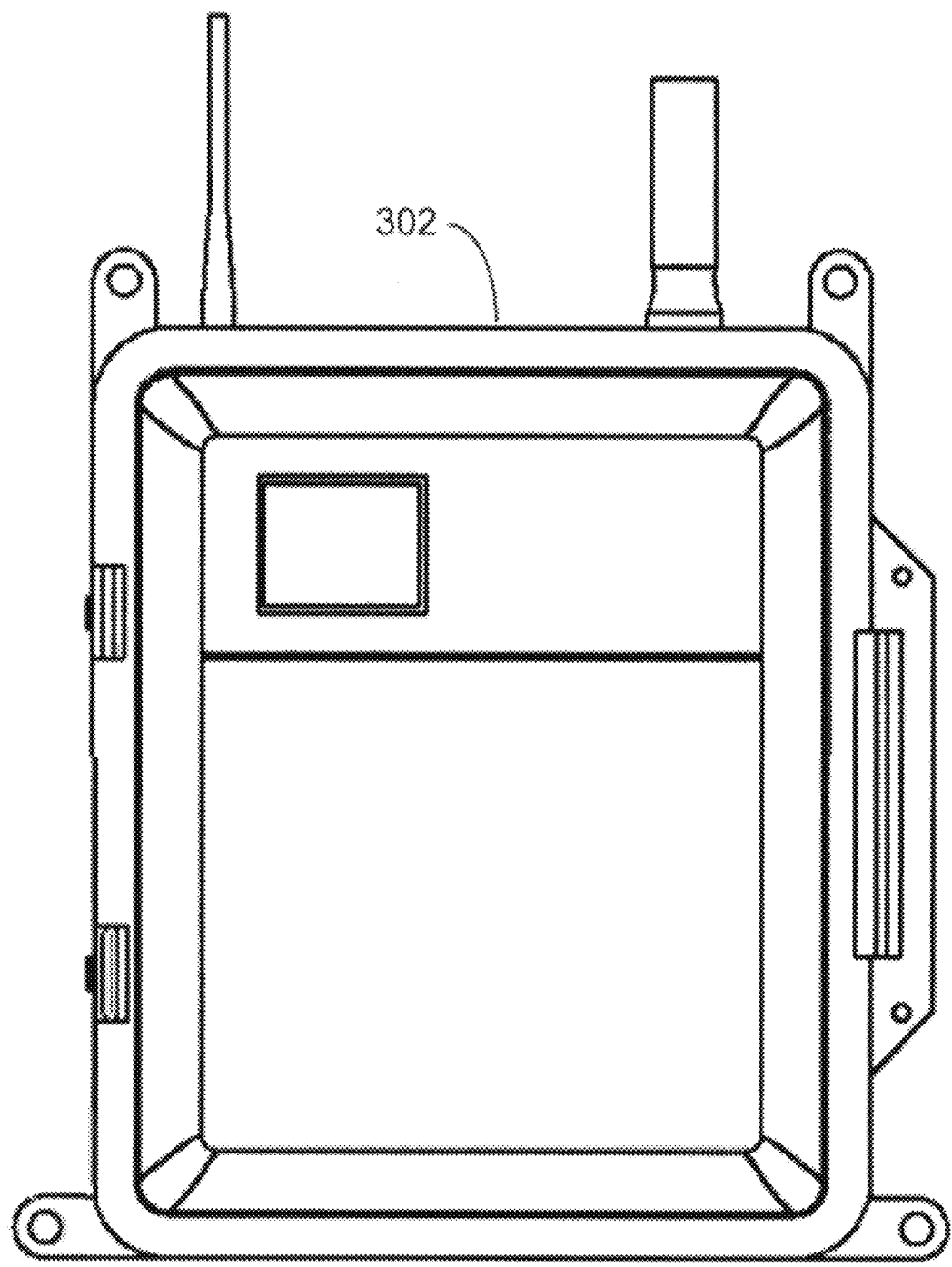
FIG. 3 depicts various modules associated with an intelligent communications device according to one embodiment of the present invention.

Referring to FIG. 3A, an outer enclosure 302 associated with the intelligent communications device 102 is shown, according to one embodiment of the present invention. The intelligent communications device 102 may be enclosed in proper casing 302 for rapid deployment. In this embodiment, the modular and compact design of the intelligent communications device 102 may protect it from damage during installation. The modular design may further enable rapid installation of intelligent communications device 102. For example, the compact modular design may facilitate installation of the intelligent communications device 102 within a small space.

In embodiments, the enclosure may be fabricated from metal, plastic, and other materials, which may be combined.

The compact modular design of the enclosure may be modified for installation in hazardous areas such as refineries, gas plants, and CNG stations. Special enclosures may be provided for installing the intelligent communications device 102 in hazardous areas. In an embodiment of the present invention, the casings and/or enclosures may facilitate a long operational lifetime of the intelligent communications device 102.

Figure 3B:
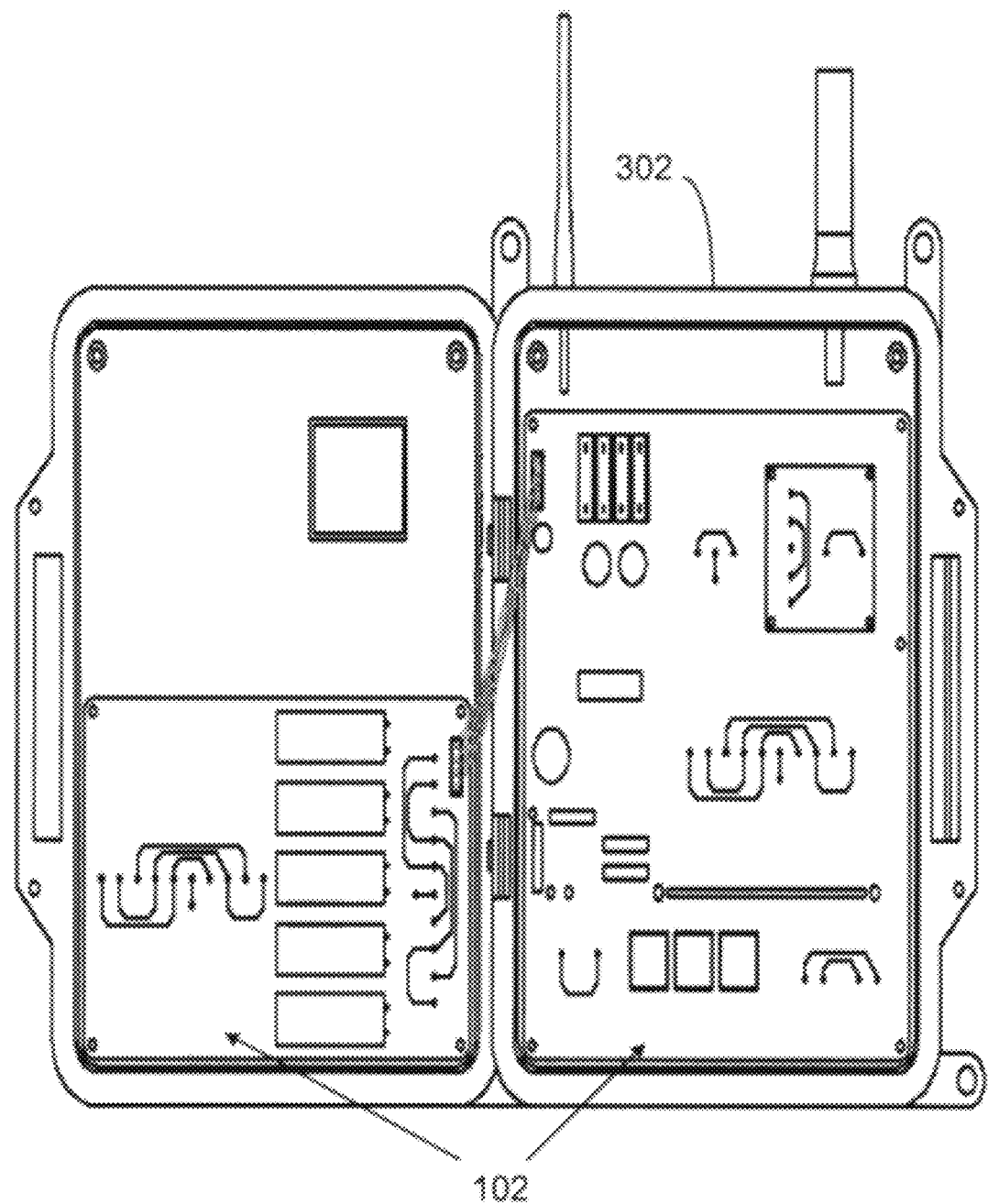

FIG. 3B depicts various circuit boards of the intelligent communications device 102 embedded in the enclosure 302 for safety. The enclosure may include circuitry 306, 308 to raise an alarm if the enclosure is tampered with by an unauthorized entity. Additionally, a provision may be provided in the apparatus that may intelligently determine if the enclosure is opened for repair through an authorized entity.

Management Tools

The intelligent communications device 102 may be interfaced with standard off-the-shelf network management tools. In an embodiment of the present invention, the management tools may be integrated in one or more utilities. Alternatively, the management tools may be implemented on computing devices such as personal computers, servers, and/or electrical control panels.

The intelligent communications device 102 may work in harmony with other smart devices in order to create a seamless infrastructure and to enhance the capability of the smart grid infrastructure. Thus, the intelligent communications device 102 may allow reclosers from one vendor to be integrated with the electronic meters from another vendor for building a collaborative smart grid infrastructure.

The intelligent communications device 102 may implement open source and may facilitate two-way delivery of real-time energy usage data over public wireless network. Further, the open source may simplify deployment of the smart devices in a smart grid infrastructure.

Security Features

In an embodiment of the present invention, the intelligent communications device 102 may secure communication between the intelligent communications device 102 and the external smart devices. For this purpose, the intelligent communications device 102 may implement various security algorithms as known in the art, including IP security and cryptography for secure transfer of data. Internet Protocol Security (IPsec) is a protocol suite for securing Internet Protocol (IP) communications by authenticating and encrypting each IP packet of a data stream. In another embodiment, the intelligent communications device 102 may implement RSA algorithm for securing data transfer.

In embodiments, the intelligent communications device 102 may facilitate collaboration between various interconnected equipment in the smart grid infrastructure. For example, the intelligent communications device 102 may facilitate collaboration between groups of consumers. In another example, the intelligent communications device 102 may facilitate collaboration between different electrical appliances belonging to a particular consumer. In yet another example, the intelligent communications device 102 may facilitate optimization and collaboration of electricity usage related to a particular electrical appliance, for example, a consumer washing machine.

The transmission aspect may be focused on surveillance, fault management, and/or voltage regulation, among others. The intelligent communications device 102 includes software and/or applications for monitoring and surveillance, fault management, and/or voltage regulation. Reports of unusual activity detected by the intelligent communications device 102 may be forwarded to a control station or to security staff via alert. The recorded data may be recorded in a log file, which may be forwarded to the concerned authority in real-time for remedial action. Alternatively, the intelligent communications device 102 may, based on its own capability, resolve the issue without raising an alert.

The distribution aspect may include among other aspects monitoring and management of switches, meters, and/or reclosers. The intelligent communications device 102 may allow integration of various devices into seamless smart grid configuration. For example, a meter from one vendor may be configured with the recloser from another vendor. By implementing open standards in the intelligent communications device 102, the distribution companies can focus on building the smart grid infrastructure without worrying about the product working on a dedicated technology, since the intelligent communications device 102 may act as a universal hub for integrating various technologies.

A consumer may utilize the intelligent communications device 102 for conserving electrical consumption. In this aspect, consumer devices may be directly connected with the intelligent communications device 102. Exemplary consumer devices may include transformers, fault management devices, power meters, water meters, gas meters, load limiters, and disconnect switches. The intelligent communications device 102 may manage these smart devices in an optimum manner for saving electricity.

Solar Power

In an embodiment of the present invention, the intelligent communications device 102 may be solar powered. The outer enclosure of the intelligent communications device 102 maybe fitted with photovoltaic cells that may receive solar energy. The solar energy may be utilized to charge one or more batteries; the charged batteries may allow communication with utility management infrastructure even during a power failure. Thus, the apparatus may work continuously without interruption.

Solar power may be further utilized to provide power for critical activities during a power failure, such as clock, wireless facility, memory and other communication circuitry.

Computer-Executable Software Embodiments

In an embodiment of the present invention, the intelligent communications device 102 may include software and hardware for implementing virtualization. For example, the intelligent communications device 102 may implement hardware virtualization. Implementing virtualization may facilitate the process of disaster recovery, induce higher levels of abstraction, and increased level of security.

In yet another embodiment of the present invention, the intelligent communications device 102 may include software for implementing distributed computing architecture. For example, various software processes may communicate with databases/repositories of the central control station to periodically update the repositories and/or databases. Such an arrangement may reduce the probability of loss of data during disaster and/or failure of other equipment.

In yet another embodiment of the present invention, the software-implemented multiple processes enable processing of data in real time. In this aspect, the software executed by the associated processor may spawn multiple threads for faster execution and real-time monitoring of the utilities. Such implementation may facilitate quick response to adverse events, thereby reducing the probability of failure of the overall infrastructure.

Figure 3C:
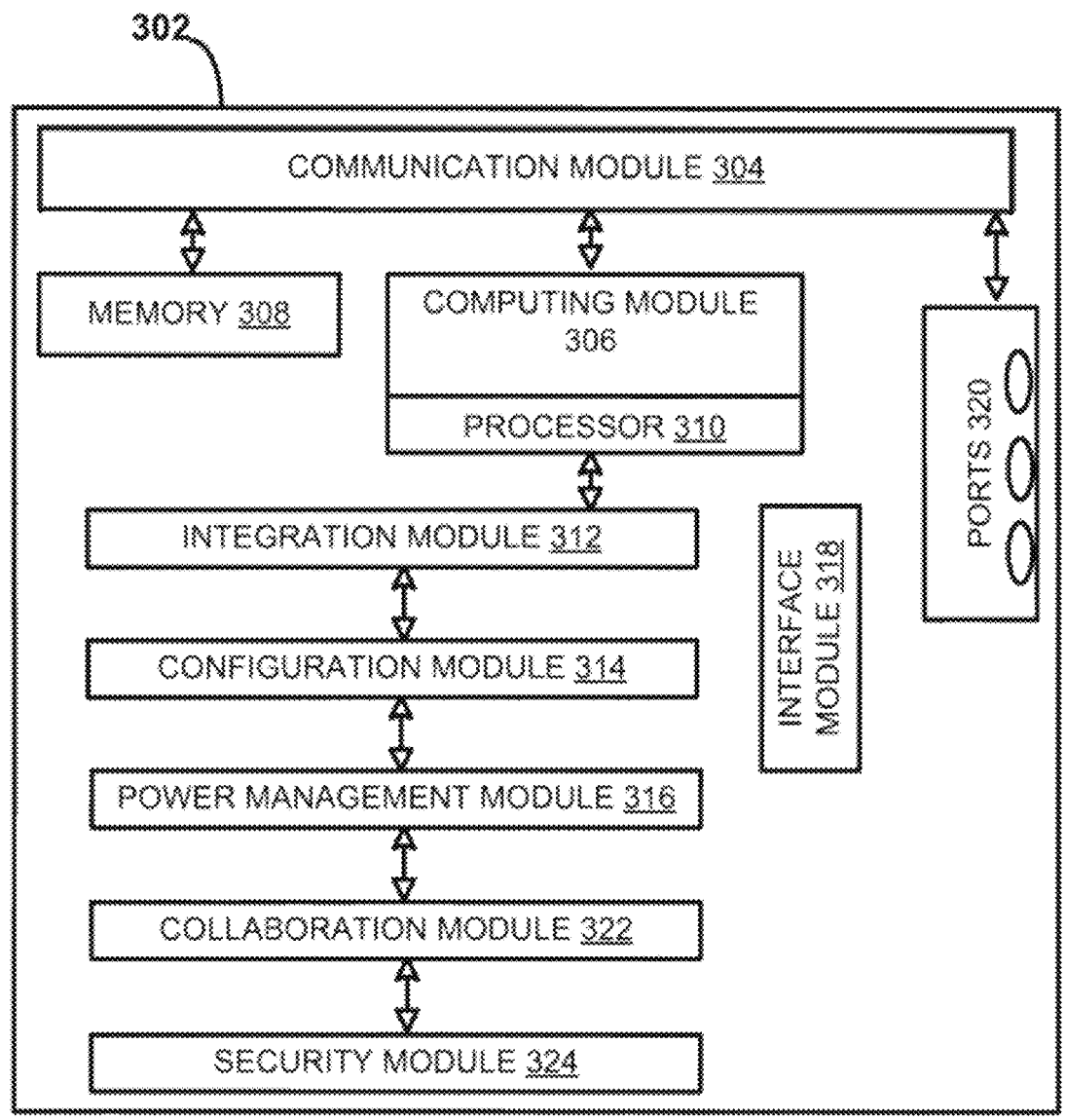

Referring to FIG. 3C, the intelligent communications device 102 may include an enclosure 302, a communication module 304, a memory 308, and a computing module 306 having a processor 310. The communication module 304 may be coupled with the memory 308 and to the computing module 306. In addition, the computing module 306 may be associated with the integration module 312 as well as interface module 318. The smart devices and/or facilities may be attached at one or more ports 320. The data received at one or more ports 320 may be forwarded to an integration module 312, a configuration module 314, a power management module 316, and the collaboration module 322. Additionally, smart devices may be incorporated into the smart grid infrastructure using a collaboration module 322.

In an embodiment of the present invention, addition of a device at one of the ports 320 may initiate integration of the device into the smart grid infrastructure. The signal received from the device may be forwarded to the interface module 318 to determine the type of device, attributes, and other details for integration with the intelligent communications device 102. Once the parameters of the devices have been ascertained, the integration module 312 and the configuration module 314 may facilitate integration for incorporating the device into the smart grid infrastructure. For example, the configuration module 314 may search for device drivers, applications and other software that may enable smooth adaptation of the device into the smart grid infrastructure.

In an embodiment of the present invention, a security module 324 may secure communication between the external smart devices and/or various facilities. For example, the security module may use encryption techniques known in the art for protecting data. Likewise, different security protocols may be implemented by the security module 324 for protecting data.

Figure 4:
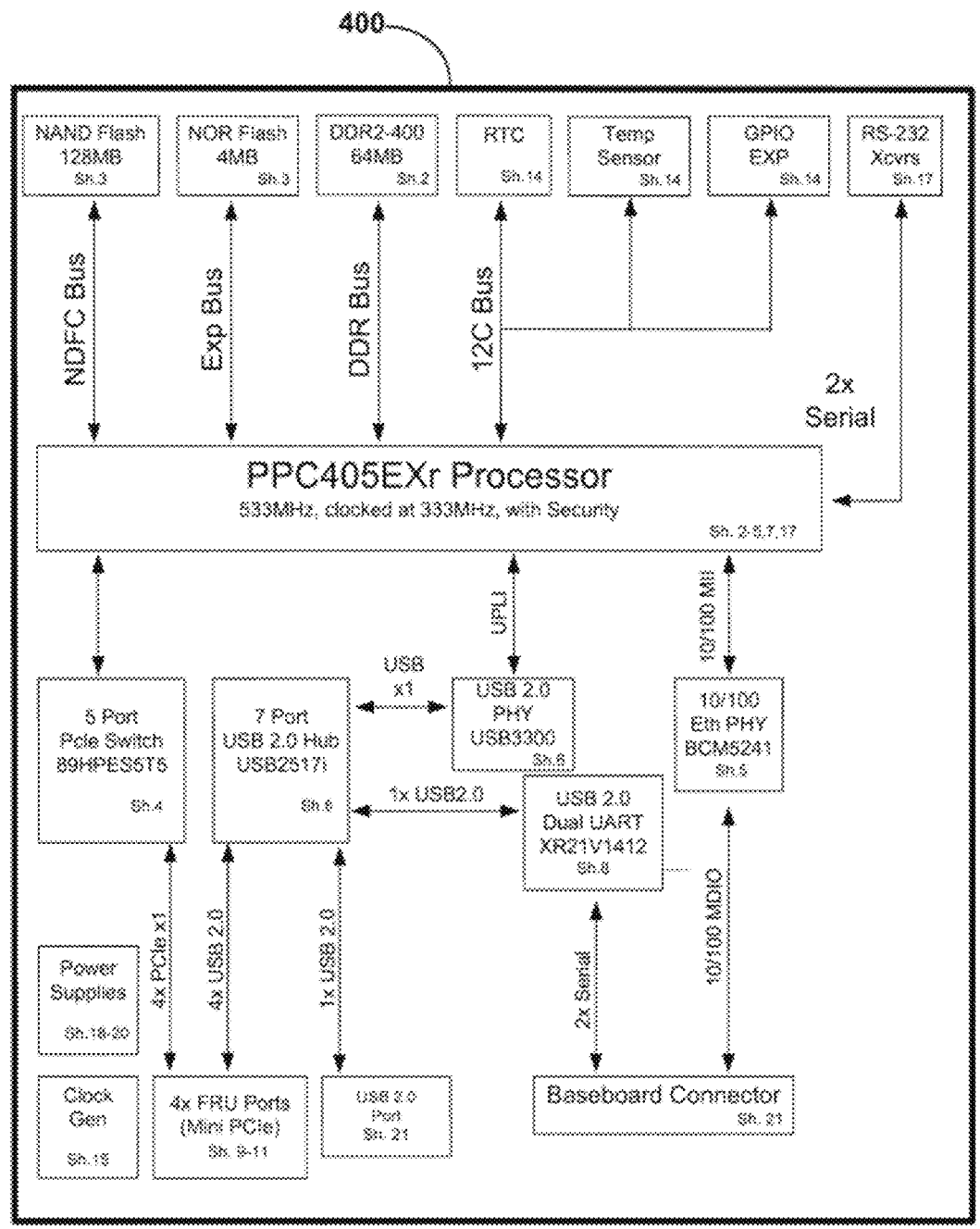
FIG. 4 schematically shows operative circuitry for an intelligent communications device according to one or more embodiments of the present invention.

Referring to FIG. 4, an exemplary outlay 400 of an intelligent communications device 102 is shown, according to one embodiment of the present invention. The internal configuration of the apparatus 400 may include a NAND flash, a NOR flash, a RAM, Temperature sensor, a, RTC, a GPIO, and an interface circuitry such as RS232 coupled to the processor, such as PPC405 EXr Processor. Additionally, a plurality of ports may be interfaced with the processor, such as USB ports, Ethernet ports, switch input connectors, and/or hubs. The circuitry may receive AC/DC power from the power supply, and the power supply may deliver different voltages such as +5V, −5V, +12V, −12V, +15V, −15V and other voltages. Various connectors may be utilized for connecting different type of active and passive components. A clock generation circuitry may be provided for servicing circuits requiring clock pulses.

In an embodiment of the present invention, integrated circuits may be utilized for assembling the embodiment shown in FIG. 4 in association with other active and passive electronic components. Additionally, the circuitry may be laid on a multiple tier PCB for laying the passive and active electronic components and circuits.

Automated Unattended Recovery

According to one or more aspects of the present invention, memory management plays an integral role in maintaining normal operation of the intelligent communications device 102. The device 102 may need to monitor an amount of memory free for loading programs, subroutines, and/or other executable code for imparting functionality to the intelligent communication device 102. The kernel may be responsible for memory management process, and as one example, may take corrective action based on the availability of free memory. The intelligent communication device 102 may periodically require a restart for freeing the memory occupied due to memory leaks, dangling pointers, and/or other processes that may consume memory space even when the intelligent communications device 102 is not active. The kernel may monitor memory space and may take corrective action once a certain threshold level is reached or exceeded. For example, the kernel may initiate a restart of the intelligent communications device 102 in order to free memory from the resources. This may operate to prevent the intelligent communication device 102 from entering a disabled state in which it may be unable to communicate in the network or to execute programs.

One or more aspects of the present invention relate to a device and method for backing up an active image into a first backup image and a second backup image for automated recovery of the intelligent communication device 102. In one embodiment, the intelligent communication device 102 includes one or more storage devices. The storage device(s) may be integrated into the intelligent communications device 102 or alternatively arranged in a configuration that allows for the first backup image and/or the second backup image to be located outside of the intelligent communication device 102. In one embodiment, the active image is backed up in the first backup image and an authentication of the first backup image may be performed using software subroutines. Once the first backup image has been successfully authenticated, the second backup image may be updated by the most recent copy of the first backup image. In another embodiment, the second backup image is the default image stored with factory settings. In this embodiment, the default image is an authenticated and tested image that is stored in the memory during the manufacturing process.

Figure 5A:
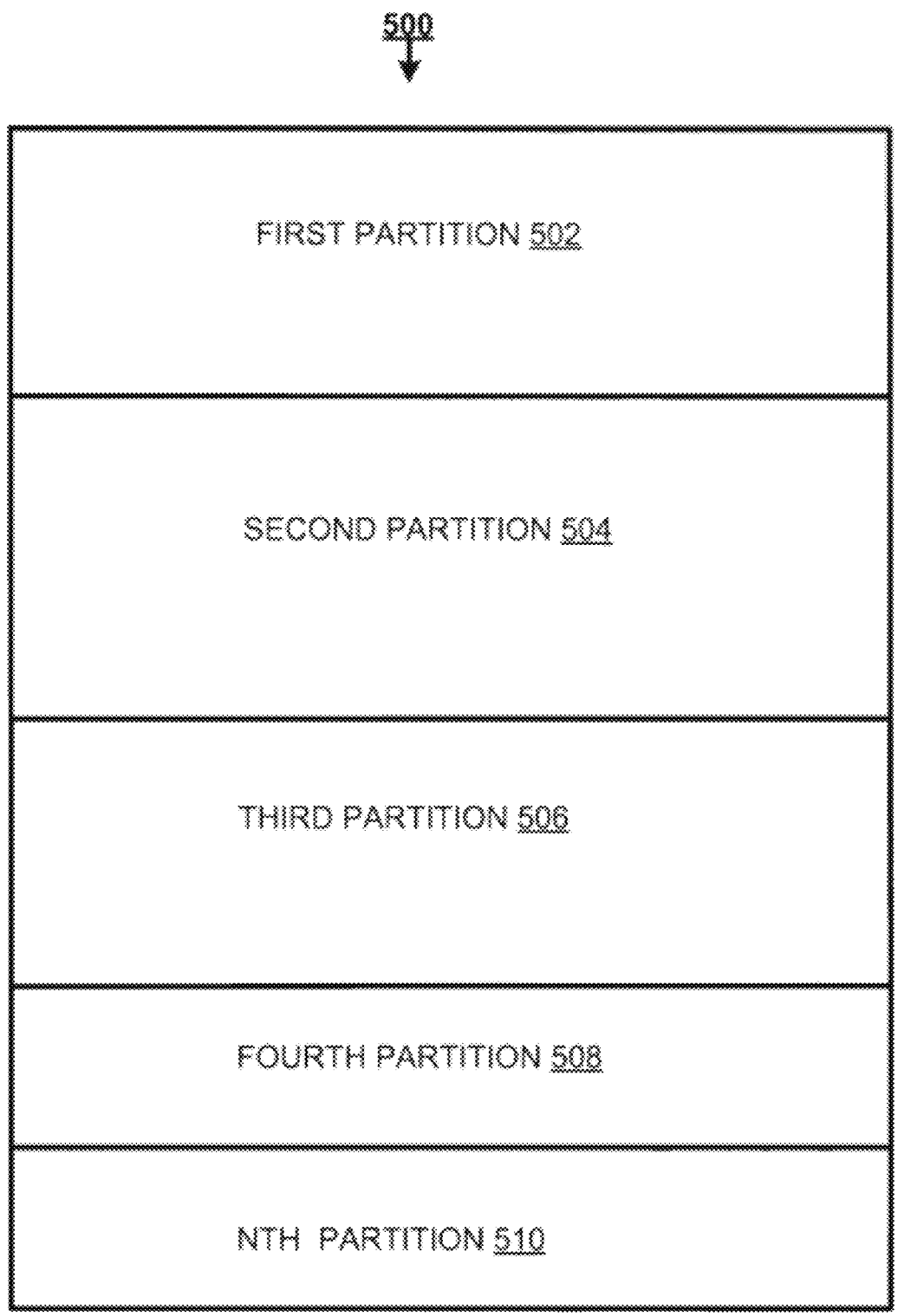
FIG. 5A and FIG. 5B schematically show a storage device with multiple partitions, according to one embodiment of the present invention.

FIG. 5A illustrates a schematic block diagram 500 of a plurality of partitions 502, 504, 506, 508, and 510 of a storage device (for example, storage device 308) for storing a first backup image and a second backup image, according to one embodiment of the present invention. The partitions, as shown, include a first partition 502 storing the active image, a second partition 504 storing the first backup image, a third partition 506 storing the second backup image, and other partitions such as a fourth partition 508 and up to an nth partition 510. In the embodiment shown in FIG. 5A, each partition may include one or more clusters, and each cluster may have one or more sectors. Each sector may store a part of backup data for restoring the active image, the first backup image, and the second backup image. The active image stored in the first partition may be utilized for initiating a booting up process for the intelligent communications device 102.

Figure 5B:
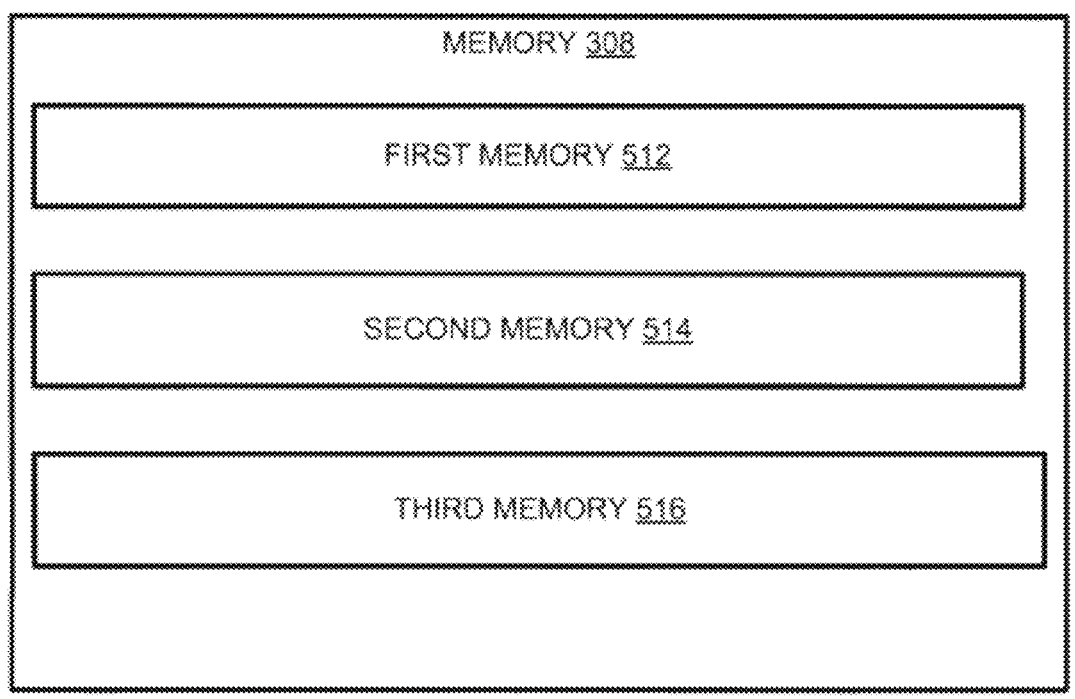

Referring now to FIG. 5B, in one embodiment, the active image is stored in a first memory 512, the second backup image in a second memory 514, and a third image in a third memory 516. In this arrangement, a software subroutine may be provided that operates to swap the active image of the first memory 512 with the first backup image of the second memory 514, to boot the operation of the intelligent communications device 102 into a steady state.

In one embodiment, the intelligent communication device 102 may interface with one or more smart grid devices. The smart grid devices may communicate with the intelligent communication device 102 through subroutines and/or programs. The subroutines or programs may access the memory 308 of intelligent communication device 102 making it vulnerable to the malicious attacks. Likewise, the internal program and subroutines may malfunction due to certain abnormal conditions, such as but not limited, to high temperature of the intelligent communication device 102, failure of one or more components, memory leaks, program contamination with external virus, worms, time bombs and other malicious programs. The intelligent communication device 102 may include a self-healing and self-protecting mechanism that may allow it to reset and recover from malicious attacks, viruses, and other faults.

The kernel may include processes, subroutines, programs, subprograms and other executable instructions being executed or waiting for processor time. Monitoring of these processes, subprograms, routines, subroutines, sub-programs will ensure proper functioning of the intelligent communication device 102. In addition, the monitoring also ensures that all the processes in the execution queue are executed by the processor 310 based on pre-specified criteria such as but not limited to the priority attached to each of the processes. The intelligent communication device 102 may fail to execute one or more processes due to certain conditions such as unusual long time for executing a single process, deadlock, exceptionally large programs that cannot fit into memory, resource constraints, or other conditions. In such situations, the kernel may initiate a backup and recovery process for recovering from an unusual state to an operational state.

The backup and recovery process may be stored into the memory 308. In one embodiment, the backup and recovery process is be stored in a RAM, ROM, primary memory, hard disk, flash memory, or a computer-readable medium associated with the intelligent communication device 102. For managing the recovery process, the intelligent communication device 102 initiates process 600, which monitors one or more conditions to ensure the performance of the intelligent communication device 102 in the operational state. In an embodiment, the process 600 is an open source routine or an application program for ensuring the performance of the system in the operational state.

In an embodiment of the present invention, one or more subroutines/programs monitor the charge on one or more capacitors to examine the health of the intelligent communication device 102. Alternatively, the one or more subroutines examine the health of the active and passive components based on the charge on one or more capacitors. Similarly, the intelligent communication device 102 may monitor the power supply feed to each of the circuitry to ascertain the performance and health of the intelligent communication device 102. A power failure may send an alert to the server or a central agency about a power outage. The subroutines may facilitate in circumventing the condition of abrupt shutdown. A power backup facility such as but not limited to battery may be utilized to provide power to the intelligent communication device 102 during a power failure. In one or more instances, the subroutines may determine that it is dangerous to operate the intelligent communication device 102. To avoid data loss in these scenarios, the subroutines may shutdown the intelligent communication device 102.

Figure 6:
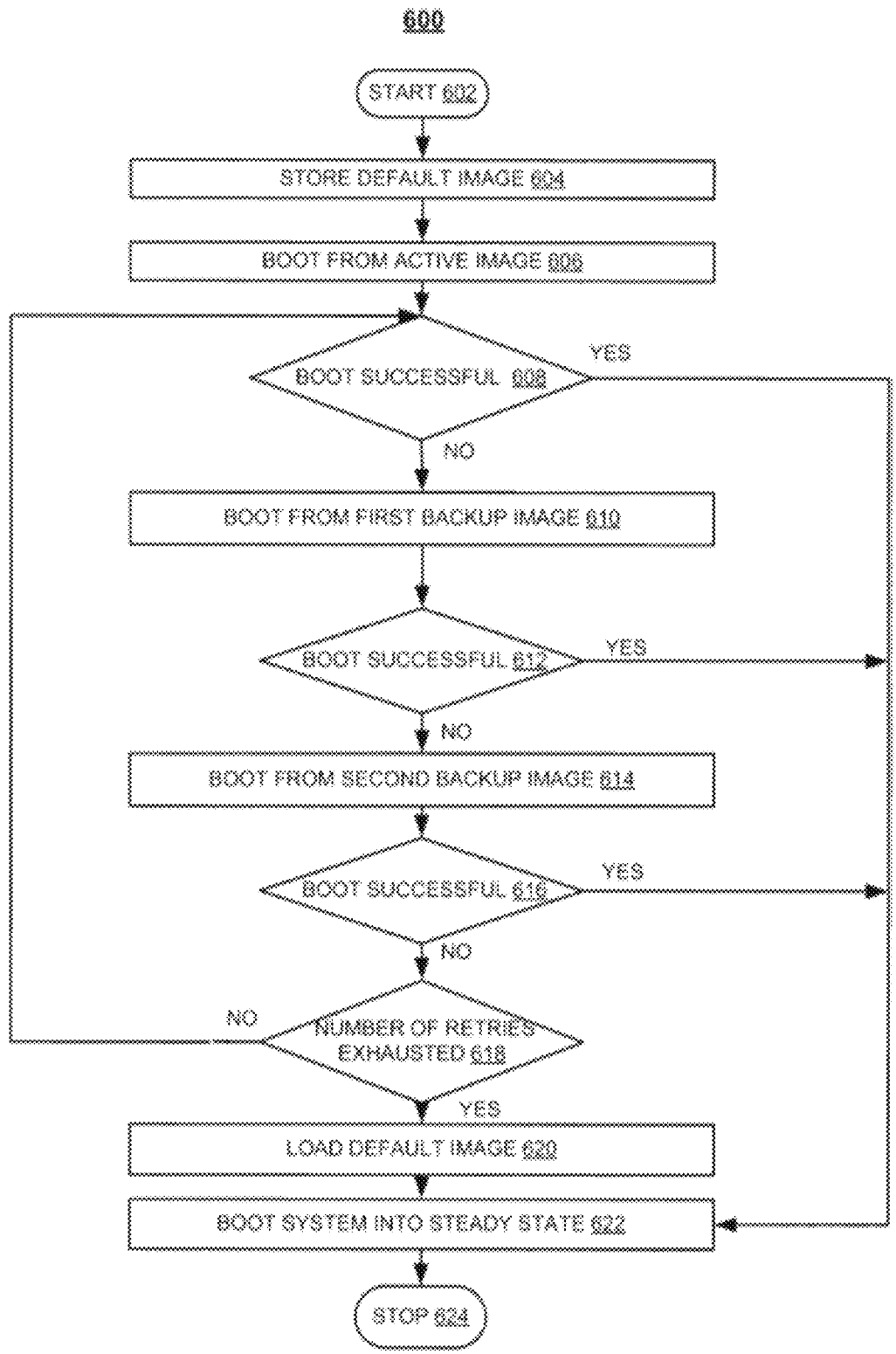
FIG. 6 is a flow chart showing operational steps of a routine for automated restoration of an intelligent communication device, according to one embodiment of the present invention.

Referring to FIG. 6, operational steps of a routine 600 for initiating a recovery of the active image are shown, according to an embodiment of the present invention. The routine 600 starts at step 602 and immediately moves to step 604. At step 604, the active image is stored in the memory 308. This active image corresponds to the default image, which is validated to be an authentic boot image. The first backup image and the second backup image also store default images. The routine 600 may be operative to receive upgrades for changing one or more of the active image, first backup image, and second backup image.

The intelligent communication device 102 may include an update facility, which may update the routine 600 associated with the intelligent communication device 102 with the new updates. The update facility may continuously instigate the server for availability of updates. As soon as the updates are available, the intelligent communication device 102 may download the updates and apply it for upgrading the intelligent communication device 102.

The intelligent communication device 102 may receive updates from the server prompting it to update itself with latest software patches/updates. In an embodiment of the present invention, the updates may be first applied to the active image; the active image may try to boot itself into an operational state; a failure to boot the intelligent communication device 102 into the operational state may initiate a recovery routine. In this aspect, the recovery may be performed from the first backup image. During the recovery, the routine 600 may replace the active image with the operational first backup image. This may be considered as a simple recovery operation.

In an alternative embodiment of the present invention, the updates may be applied to the first backup image; the updates may be validated by booting the intelligent communication device 102 from the first backup boot image. If the intelligent communication device 102 can be successfully booted after applying the updates then the updates may be applied to the active boot image else the updates may be discarded. Otherwise, if the intelligent communication device 102 fails to boot properly from the first backup image the updates may be discarded. In this scenario, the intelligent communication device 102 may boot from the active image, initiate a backup routine to create a new copy of the first backup image, which may be utilized to restore the intelligent communication device 102 later, in case of a disaster.

The second backup image may store the default image (factory-applied image) in an embodiment of the present invention. In another embodiment, the second backup image may store the last backup image, which is a valid good image. It may be understood that the last known good backup may not always be equivalent to the first backup image.

A failure to boot correctly into the operational state may prompt the recovery routine to replace the failed active image with the default image. It may be noted that the terms 'operational state' and 'steady state' both refer to normal operation of the intelligent communication device 102 and are used interchangeable in this description. In another embodiment of the present invention, the recovery subroutine/program/routine loads and replaces the failed active image with the second backup image after the intelligent communication device 102 has failed to recover, by applying a recovery routine through the first backup image.

At step 606, an attempt to boot the intelligent communication device 102 into the operational state through the active image is initiated. At step 608, it is determined if booting of the intelligent communication device 102 is successful. If the intelligent communication device 102 boots successfully, the routine 600 proceeds to step 622 and boots the intelligent communication device 102 into the operational state. Otherwise, the routine 600 proceeds to step 610. At step 610, the intelligent communication device 102 attempts to boot from the first backup image. At step 612, the it is determined if the intelligent communication device 102 had successfully booted. If the intelligent communication device 102 can be successfully booted, the routine proceeds to step 622 and boots into the operational state. Otherwise, the routine 600 moves to step 614. At step 614, the routine 600 attempts to boot the intelligent communication device 102 from the second boot image. At step 616, the routine 600 determines if the boot from the second backup image was successful. If the intelligent communication device 102 is successfully booted from the second boot image, the routine may immediately move to 622. Otherwise, the routine 600 proceeds to step 618. At step 618, a determination is made of the number of attempts to boot the intelligent communication device 600 into the operational state. In this embodiment, a watchdog is provided to keep track of the number of reboots already attempted. In an embodiment of the present invention, the watchdog is be a software counter or a hardware facility. If the number of reboots attempted has exceeded a threshold value then the default image is restored and the intelligent communication device 102, to allow the is intelligent communication device to boot into the operational state. Otherwise, the routine 600 continues to attempt booting the intelligent communication device 102 using the first backup image and the second backup image.

In one embodiment of the present invention, one or more types of memory are utilized for the first backup image and the second backup image. For example, the first backup image may be executed on the secondary memory and the second backup may be executed on the memory located outside the intelligent communication device 102. Similarly, in another embodiment of the present invention, both the first backup image and the second backup image are executed on different secondary memories. For example, the first backup image may be created on a hard disk and the second backup image may be performed on a flash memory.

In various embodiments, the one or more memory may be an EPROM, an EEPROM, a hard disk, a flash memory, a CD-ROM, a DVD, a RAID or other types of storage devices.

Referring again to step 622, once the operational state has been attained, the intelligent communication device 102 initiates necessary action for recovery. In an embodiment of the present invention, the intelligent communication device 102 utilizes the first backup image to overwrite the corrupted active image, if the intelligent communication device 102 can successfully boot from the first backup image. Alternatively, the intelligent communication device 102 utilizes the second backup image to overwrite the corrupted active image and the corrupted first backup image, if the intelligent communication device can successfully boot from the second backup image.

In another embodiment of the present invention, the intelligent communication device 102 may initiate a subroutine for booting the intelligent communication device 102 into the operational state. In this embodiment, the intelligent communication device 102 attempts to boot into steady state by alternatively booting form the first backup image and the second backup image until the subroutine is able to boot into steady state. This may be referred as 'progressive boot'. In an alternate embodiment of the present invention, the subroutine utilizes the first backup image to boot into the operational state until an error is encountered. At this point, the subroutine tires to perform the subsequent steps from the second backup image. If such a boot is successful, then the subroutine creates a new image based on amalgamation of the partial first backup image and the partial second backup image. At step 624, the routine 600 ends.

In one embodiment of the present invention, the first backup image and the second backup image are stored in a compressed format. Any standard compression techniques may be utilized to compress the first backup image and the second backup image. The compression of backup image may facilitate storing of more than one backup image into the memory 308.

Figure 7:
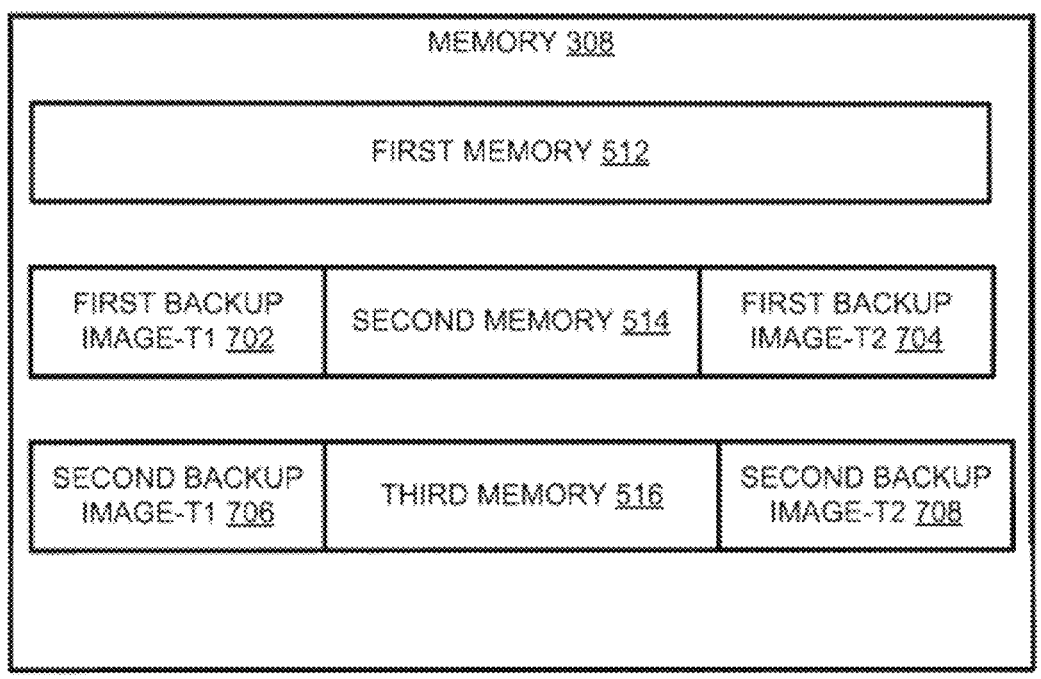
FIG. 7 schematically shows first and second backup images, according to one embodiment of the present invention.

Referring to FIG. 7, multiple versions of the first backup image and the second backup image are depicted, according to one embodiment. First memory 514 is shown as having two different copies of the first backup image created at different dates and time. As an example, the first backup image-T1 702 may have been created on Dec. 25, 2009 at 3.00 p.m., whereas another different version of the first backup image-T2 704 may have been created on Dec. 29, 2009 at 4.00 p.m. Similarly, multiple versions of second backup image may be created. For example, third memory 516 may store two different backup images such as a second backup image-T1 706 created at date D1 and time DT1 and a different second backup image-T2 created at date D2 and time DT2. Although only two backup images have been shown in the embodiment of FIG. 7, those skilled in the art will appreciate that multiple backups in compressed and non-compressed forms may be created in alternate embodiments without deviating from the scope and spirit of the invention.

Figure 8:
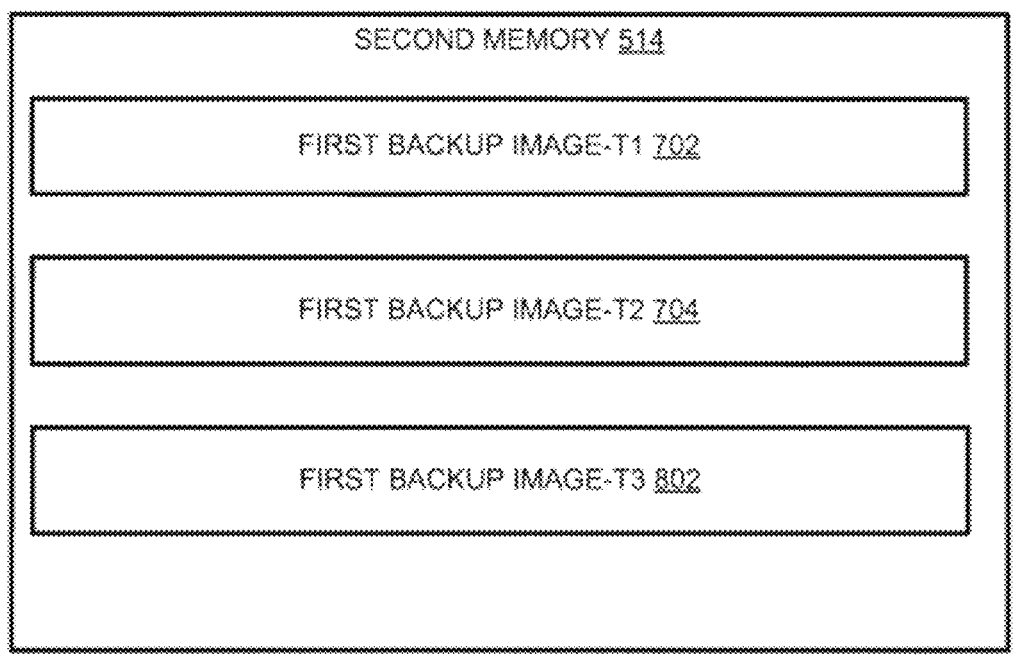
FIG. 8 schematically shows first and second backup images for recovery of an intelligent communication device, according to one embodiment of the present invention.

Now referring to FIG. 8, in one embodiment of the present invention, the multiple backup images may be utilized to boot the intelligent communication device 102 into the operational state. As shown, the second memory 514 includes include multiple copies of the first backup image created at different times. As an example, the second memory 514 may include a first backup image-T1 702 created on Aug. 23, 2010, a first backup image-T2 704 created on Aug. 24, 2010, and a first backup image-T3 802 created on Aug. 25, 2010.

The first backup image and the second backup image may require authentication for execution. The first backup and the second backup image require validation before a recovery is performed. For example, the digital management rights associated with the first and the second backup image may require automatic authentication from a remote server to execute the recovery operation. Alternatively, the recovery operation may be performed within the protected mode that may boot the intelligent communication device 102 with minimum set of operating services.

The methods described herein may be deployed in part or in whole through one or more devices that are capable of executing computer software, program codes, and/or instructions on corresponding processors. A processor may be part of a server, client, network infrastructure, mobile computing platform, stationary computing platform, or other computing platform. The processor may be any kind of computational or processing device capable of executing program instructions, codes, and/or binary instructions. The processor may be or may include a signal processor, a digital processor, an embedded processor, a microprocessor or any variant such as a co-processor (e.g. a math co-processor, a graphic co-processor, and/or a communication co-processor), that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program and instructions are described herein may be implemented in one or more threads. A thread may spawn other threads that may have assigned priorities associated with them; the processor may execute these threads based on a priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other types of instructions capable of being executed by the computing or processing device may include, but may not be limited to, one or more of a CD-ROM, DVD, memory, hard disk, flash drive, RAM, ROM, and/or cache.

The processor may include one or more cores that may enhance speed and performance of a multiprocessor. In embodiments, the process may be a dual core processor, quad core processors, or other chip-level multiprocessors that combine two or more processors.

The methods and systems described herein may transform physical and/or intangible items from one state to another. The methods and systems described herein may also transform data representing physical and/or intangible items from one state to another.

The elements described and depicted herein, including the elements described in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, and/or routers. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs steps thereof. In another aspect, the methods may be embodied in systems that perform steps thereof, and may be distributed across devices in a number of ways, or all of the functionality may be integrated into a dedicated, standalone device or other hardware. In another aspect, the means for performing steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples.

What is claimed is:

1. A method for automated unattended recovery of a remotely deployed intelligent communication device in a network, the intelligent communication device including a programmable processor and a storage device for storing a plurality of images, the method comprising:
   partitioning the storage device into plurality of partitions, the plurality of partitions comprising at least a first partition, a second partition, and a third partition;
   storing an active image comprising a root file system in the first partition;
   storing a first backup image comprising a backup root file system in the second partition;
   storing a second backup image in the third partition, wherein the second backup image is different from the first backup image;
   detecting a failure of the active image;
   restoring the active image with the first backup image in response to the failure of the active image; and
   if the intelligent communication device fails to boot after restoration from the first backup image, restoring the intelligent communication device with the second backup image.

2. The method of claim 1, wherein the plurality of partitions reside on a single storage device.

3. The method of claim 1, wherein the plurality of partitions reside on more than one storage device.

4. The method of claim 1, wherein at least one of the plurality of partitions is configured to operate as a remote storage device.

5. The method of claim 1, wherein the storage device is at least one of an EEPROM, an EPROM, a ROM, or a flash memory.

6. The method of claim 1, wherein the active image is operative to receive updates from a remote server.

7. The method of claim 1, further comprising configuring a remote processing module operatively connected to the programmable processor to notify a remote entity when restoration of the root file system in the first partition with the backup root file system in the second partition is complete.

8. The method of claim 1, wherein the programmable processor is programmed to selectively write data on particular areas of at least one of the plurality of partitions such as to minimize a number of re-writes on the at least one partition.

9. The method of claim 1, wherein the intelligent communications device further comprises a hardware watchdog.

10. The method of claim 9, wherein the hardware watchdog is operative to provide a flag to identify a successful reboot in a steady state.

11. The method of claim 1, wherein a boot failure comprises a failure of the intelligent communication device to successfully run one or more initialization scripts.

12. The method of claim 1, wherein the storage device is operable at a location external to the intelligent communications device.

13. The method of claim 1, wherein the network comprises a smart grid.

14. A method for automated unattended recovery of a remotely deployed intelligent communications device in a network, the intelligent communication device including a programmable processor and a storage device for storing applications and data, the method comprising:
  partitioning the storage device into plurality of partitions, the plurality of partitions comprising at least a first partition, a second partition, and a third partition;
  storing an active image comprising a root file system in the first partition;
  storing a first backup image comprising a backup root file system in the second partition;
  storing a second backup image in the third partition;
  detecting a failure of the active image; and
  performing a disaster recovery operation comprising alternatively restoring the active image with the first backup image and the second backup image for restoring the operational state.

15. The method of claim 14, wherein the storage device is either a primary memory device or a second memory device.

16. The method of claim 14, wherein the plurality of partitions reside on a single storage device.

17. The method of claim 14, wherein the plurality of partitions reside on more than one storage device.

18. The method of claim 14, wherein at least one of the plurality of partitions is configured to operate as a remote storage device.

19. The method of claim 14, wherein the storage device is at least one of an EEPROM, an EPROM, a ROM, a flash memory, and a plasma memory.

20. The method of claim 14, wherein the active image is operative to receive updates from a remote server.

21. The method of claim 14, further comprising configuring a remote processing module operatively connected to the programmable processor to notify a remote entity when restoration of the root file system in the first partition with the backup root file system in the second partition is complete.

22. The method of claim 14, wherein the programmable processor is programmed to selectively write data on particular areas of at least one of the plurality of partitions such as to minimize a number of re-writes on the at least one partition.

23. The method of claim 14, wherein the intelligent communications device further comprises a hardware watchdog.

24. The method of claim 23, wherein the hardware watchdog is operative to provide a flag to identify a successful reboot in a steady state.

25. The method of claim 15, wherein a boot failure comprises a failure of the intelligent communication device to successfully run one or more initialization scripts.

26. The method of claim 14, wherein the storage device is operable at a location external to the intelligent communications device.

27. The method of claim 14, wherein the network comprises a smart grid.

28. A computer-readable medium having stored thereon computer-executable instructions which, when executed by one or more processors, cause a computer to perform functions for causing an automated unattended restart of a remotely deployed intelligent communications device in a network, the intelligent communications device including a programmable processor and a storage device for storing a plurality of images, the functions comprising:
  partitioning the storage device into plurality of partitions, the plurality of partitions comprising at least a first partition, a second partition, and a third partition;
  storing an active image comprising a root file system in the first partition;
  storing a first backup image comprising a backup root file system in the second partition;
  storing a second backup image in the third partition, wherein the second backup image is different from the first backup image;
  detecting a failure of the active image;
  restoring the active image with the first backup image in response to the failure of the active image; and
  if the intelligent communication device fails to boot after restoration from the first backup image, restoring the intelligent communication device with the second backup image.

29. The computer-readable medium of claim 28, wherein the plurality of partitions reside on a single storage device.

30. The computer-readable medium of claim 28, wherein the storage device is either a primary memory or a second memory.

31. The computer-readable medium of claim 28, wherein the plurality of storage spaces reside on more than one storage device.

32. The computer-readable medium of claim 28, wherein at least one the plurality of storage spaces is operative to be configured remotely.

33. The computer-readable medium of claim 28, wherein the storage device is at least one of an EEPROM, an EPROM, a ROM, a flash memory, and a plasma memory.

34. The computer-readable medium of claim 28, wherein the storage device is operable at a location external to the intelligent communications device.

35. The computer-readable medium of claim 28, wherein the programmable processor is programmed to selectively write data on particular areas of at least one of the plurality of partitions such as to minimize a number of re-writes on the at least one partition.

36. The computer-readable medium of claim 28, wherein the intelligent communications device further includes a hardware watchdog.

37. The computer-readable medium of claim 36, wherein the hardware watchdog is operative to provide a flag to identify a successful reboot in a steady state.

38. The computer-readable medium of claim 28, wherein a boot failure comprises a failure of the intelligent communication device to successfully run one or more initialization scripts.

39. The computer-readable medium of claim 28, wherein the network comprises a smart grid.

40. An intelligent communications device operable in a network, comprising:
  (a) a storage device having a plurality of partitions operative to store images for performing at least one boot operation, the partitions comprising:
    (i) a first partition storing an active image comprising a root file system;
    (ii) a second partition storing a first backup image comprising a backup root file system; and (iii) a third partition storing a second backup image that is different from the first backup image;
(b) a detection module that is operative to detect a failure of the at least one boot operation from the active image;
(c) a first restoration module that is operative to restore the active image with the first backup image in response to a detected failure of the at least one boot operation from the active image;
(d) a second restoration module that is operative to restore the second backup image in response to a detected failure of the at least one boot operation after restoration from the first backup image; and
(e) a programmable processor operatively connected to the storage device, detection module, first restoration module, and second restoration module that is programmed to cause execution of the at least one boot operation and the functions performed by the detection module, first restoration module, and second restoration module.

* * * * *